March 8, 1966  C. S. HORNING ET AL  3,239,061
AUTOMATIC BACKWASH SAND FILTER AND PROCESS OF CLEANING SAME
Filed June 5, 1963  3 Sheets-Sheet 2
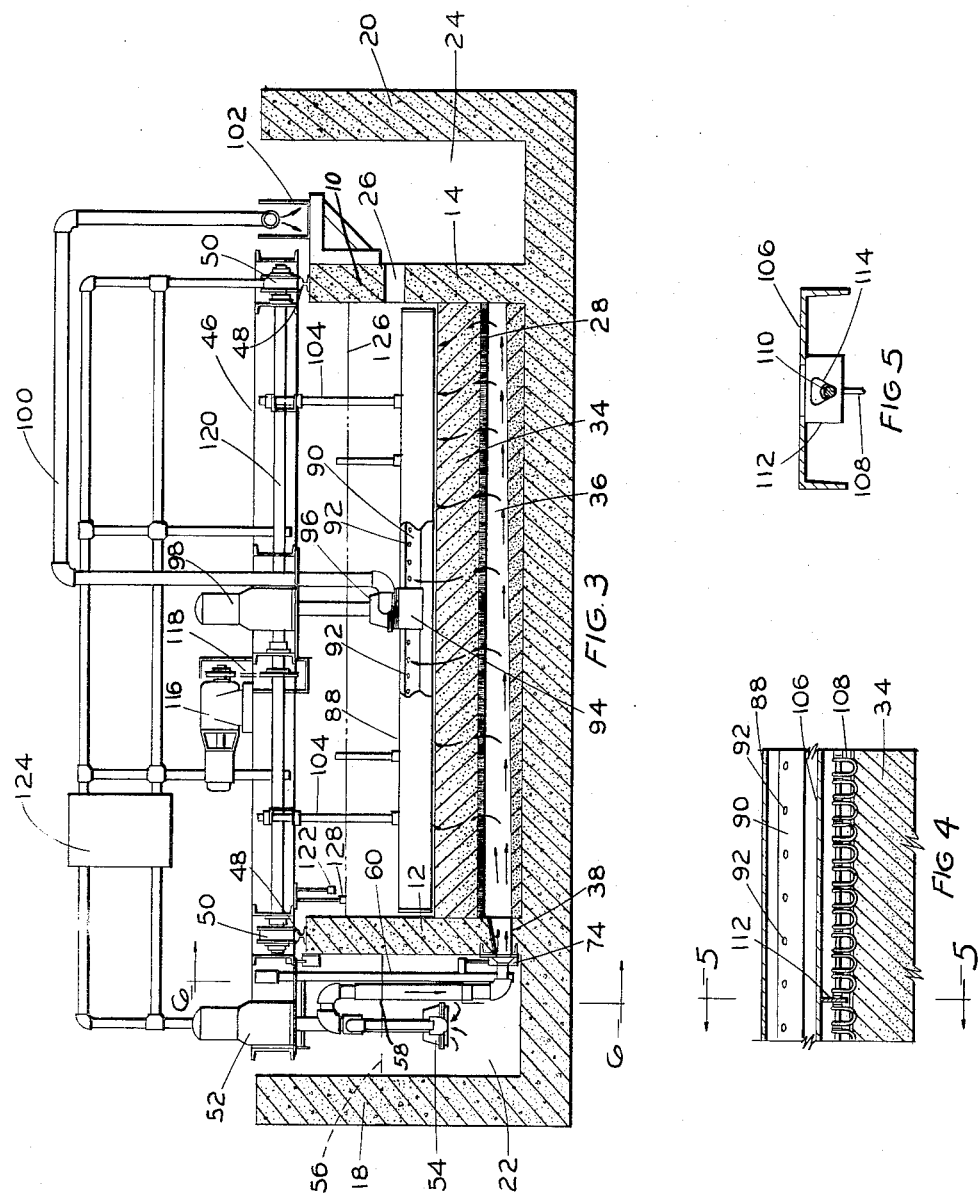
INVENTORS
CLARK SHELDON HORNING
HENRY WILLIAM JACOBS
BY
ATTORNEY

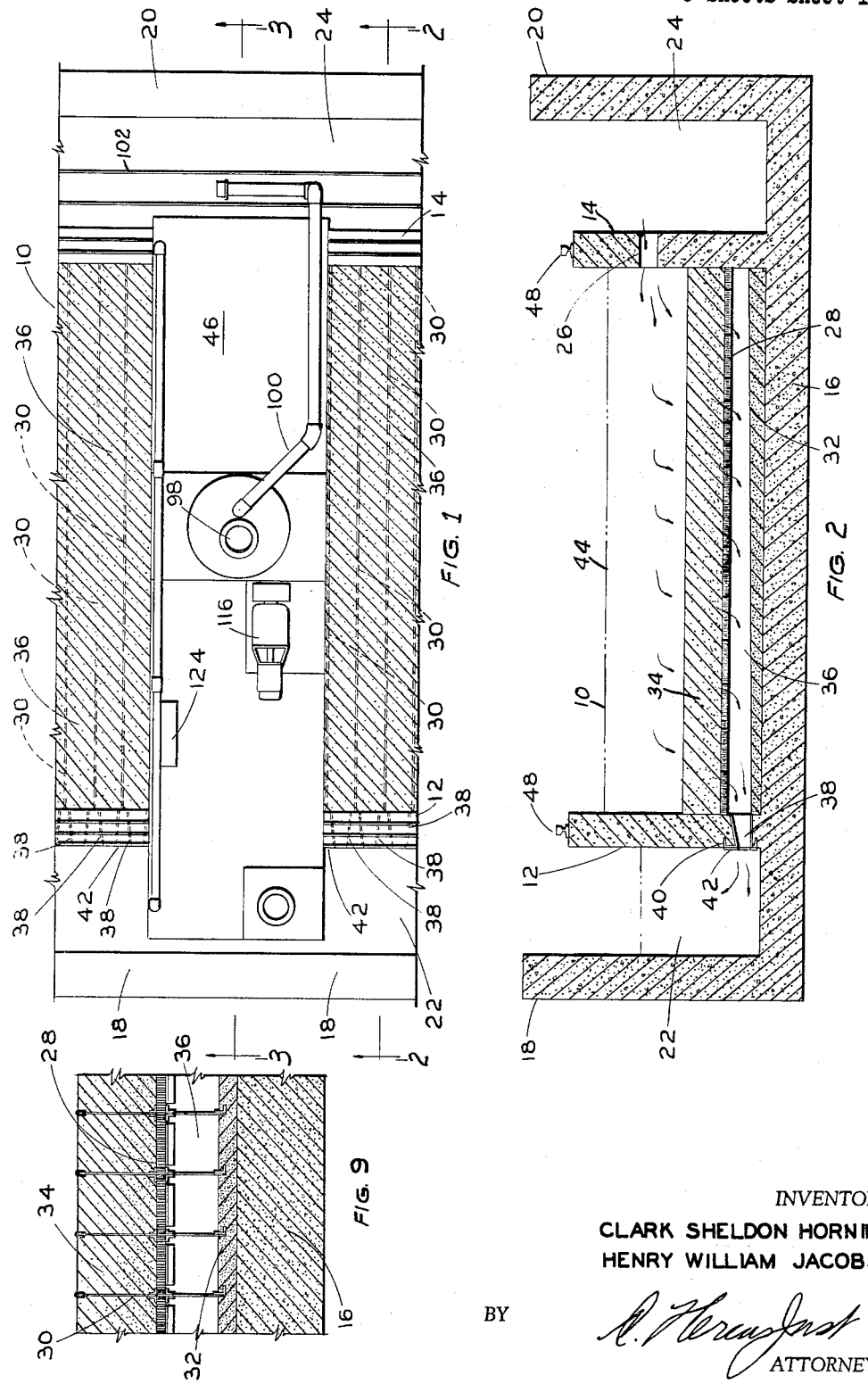

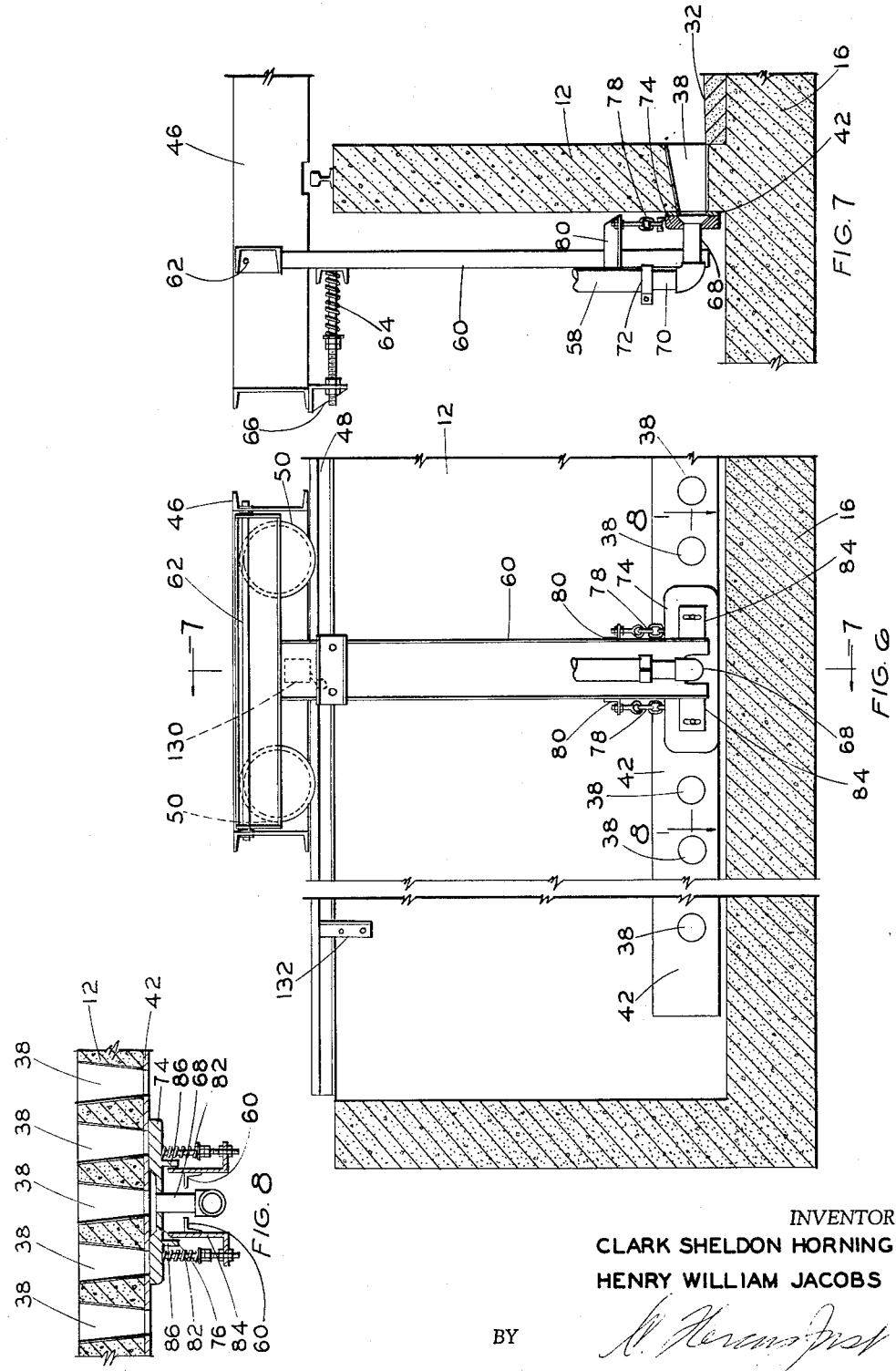

United States Patent Office 3,239,061
Patented Mar. 8, 1966

3,239,061
AUTOMATIC BACKWASH SAND FILTER AND
PROCESS OF CLEANING SAME
Clark Sheldon Horning, Dover, and Henry William
Jacobs, York, Pa., assignors, by mesne assignments, to
Koppers Company, Inc., Pittsburgh, Pa., a corporation
of Delaware
Filed June 5, 1963, Ser. No. 285,684
8 Claims. (Cl. 210—80)

This invention pertains to an automatic backwash type of sand filter and process of cleaning the same and, more particularly, to such filter and process as are employed to filter domestic and industrial water supplies. However, such filter and process are not restricted to this field of use in that the same may be employed to filter other types of liquids and fluids.

Considering the invention especially in regard to filtering water however, it has been universally recognized and has been accepted practice to improve the quality of water by filtering the same through a layer of sand. Experience has shown that this type of filter will at least partially remove suspended matter and colloids, alter the chemical characteristics of the water, and reduce the bacterial contamination.

The success of sand filtration, from a practical standpoint, depends very largely upon the cleaning and reclaiming the sand media after its usefulness has become impaired by the deposition and entrapment of material, especially in the upper portion thereof, assuming that the filtering occurs from the discharge of water, or other liquids, onto the upper surface of the sand bed, following which the water or other liquid percolates through the sand bed, while the bed traps and thereby separates from the water or other liquid most if not substantially all of at least the objectionable suspended matter and colloids occurring in the water and liquid which is to be filtered.

Provision must also be made for the removal of the waste water and the collection of the filtrate by separate means, all of which is combined with control safeguards to protect the operation.

One basic form of backwash type sand filter which has been operated with at least passable success for a number of years comprises a tank within which porous supporting means in the lower portion thereof is provided for purposes of having a sand bed of suitable depth evenly distributed thereover and supported thereby. Filtered fluid drained through the sand bed passes to fluid receiving means below the porous supporting means and from which the filtered fluid, such as water, is discharged into water mains or other distribution systems.

After a predetermined amount of contaminated material has accumulated or become lodged in the upper portion of the sand bed, whereby the rate of filtering of fluid therethrough has decreased to a predetermined level, especially as determined by the depth of the fluid accumulating on top of the sand bed, for example, backwashing mechanism is brought into operation which uses a certain amount of the filtered fluid and pumps the same reversely to the direction of normal flow through the sand filter, and upwardly through the porous supporting means and sand thereon so as to flush the accumulated, contaminating material from the upper portion of the sand bed, thereby cleaning the same. To render this operation more efficient, a washfluid hood is provided on a movable carriage which traverses the tank from end to end, said hood being disposed directly above the upper surface of the filter bed and pump means remove the upwardly discharging washfluid and contaminating material entrained therein for removal to a settling basin or waste discharge. Delivery of washfluid to the underside of the sand bed is accomplished by means of providing a series of ports along one side of the tank at a level communicating with the fluid receiving means directly below the porous support for the sand bed. One function of these ports to permit the discharge of filtered fluid therethrough for delivery to effluent discharge means. Another function of the ports however is to serve as inlet means to successive sections of the fluid receiving means beneath the porous support for the sand bed, whereby the backwashing means successively may engage said ports to pump clean, washfluid therethrough so that the same may be forced upwardly through the sand filter bed to effect the cleaning operation referred to above.

One type of mechanism capable of delivering filtered and relatively clean washfluid to such ports is a shoe which slides along the outer surface of the side of the tank which embodies said ports, said shoe having discharge means communicating with the pump for the washfluid, the pump and shoe being supported by means depending from one end of the aforementioned traveling carriage which moves along the upper portion of the tank containing the sand bed and influent which is to be filtered.

Inasmuch as the washfluid usually comprises part of the fluid which has just been filtered, it is obvious that if maximum efficiency is to be achieved with respect to cleaning the sand bed, as little washfluid as possible should be utilized. However, due to slight uneven movement of the opposite ends of the carriage which causes angularity in the path of movement which may sometimes occur and unevenness and irregularity occurring in the surface of the tank which contains the ports that communicate with the fluid receiving means and along which the aforementioned shoe slides, an undesirable amount of leakage of washfluid can occur between said shoe and the ports through which washfluid is to be discharged from said shoe. Although fluid which leaks past said shoe is discharged back into the receiving means for filtered fluid, nevertheless the power required to operate the pump to deliver adequate backward fluid is substantially in excess of what it should be if no appreciable amount of leakage occurs between the shoe and the adjacent ends of said ports. However, of greater importance is the unevenness of flow that can occur betweeen compartments, even resulting in inadequate backwash flow at times which will reduce or destroy the cleaning action.

Further, by reason of the fact that when sand beds used for filtering purposes, and especially that type used in filtering apparatus employing backwashing means, are divided into partitioned sections extending transversely of the length of the filter tank, difficulty in dislodging the silt and solids that collect on the surface of the sand bed has, in the past, been the cause of limiting the application of this type of filter for certain uses, or has required the use of excessive amounts of backwash fluid to remove the same. Mechanical means to aid in this dislodgment have, in the past, failed properly to perform the function desired. Drag chains, for example, are not uniform in action because they dig too deeply, or not deep enough, across the width of the sand compartment. They also tend to catch on the compartments, thereby stalling the whole mechanism.

In operating such backwashing type of sand filter units or systems heretofore employed, it also has been customary to institute the operation of the backwashing function when the discharge of fluid through the filter bed was reduced to a predetermined rate, usually controlled by the amount of rise of the influent fluid to a predetermined level in the tank above the sand bed. In certain other apparatus of this type, time-control means have been utilized to institute the operation of the backwashing mechanism. The control means employed for operating the backwashing mechanism, however, usually is such that the backwashing continues until the sand bed has been cleaned of accumulated contaminating material in the upper portion thereof to a desired degree, usually indicated by the level of the influent fluid being reduced to a predetermined extent, whereupon control mechanism is actuated either by float or sensing mechanism or otherwise, to discontinue operation of the backwashing mechanism.

The movement of the carriage which carries the backwashing mechanism, such as the pump, conduit and slidable shoe, operates from one end of the tank to the other and when, upon reaching said other end of the tank, reverses its direction for return to the first end and this continues successively through passes of the mechanism in reverse direction until the control mechanism stops such movement at any position in the path of movement of the backwashing mechanism where the same happens to be at the time the control means discontinues such movement.

When the movement of the backwashing mechanism next is commenced through operation of the control mechanism however, the carriage will move in the same direction as it last was moving at the time it was stopped, until one or the other end of the path of movement is reached, following which the movement is reversed, successively, until adequate backwashing occurs.

Assuming, for example, that the movement of the carriage was last stopped a short distance from one end of the tank. Upon movement of the carriage being started again to effect the backwashing function, the sections of the sand bed adjacent that end of the tank will be backwashed until the end of the tank is reached, following which the carriage will move immediately in reverse direction and thereby rewash those sections of the sand bed which have just been washed, thereby resulting in considerable inefficiency due, for example, to a tendency to cause too much silt to collect at the other end during the cycle with possible inadequate washing eventually resulting from this uneven action.

It is an object of the present invention to minimize the leakage of backwash fluid between the slidable shoe and the ports which communicate with the fluid receiving means for purposes of directing backwash fluid upwardly through the porous support and sand bed thereon so as to backwash or backflush fluid with minimum power consumption and maximum of backwash flow through all compartments.

It is another object of the invention to provide positive agitating or scarifying means carried by the washfluid hood so as to increase the efficiency of the backwashing function.

It is a further object of the invention to provide control means constructed to produce a method of operating a backwash sand filter, and particularly the delivery means for the backwash fluid, in such manner that the carriage which supports the delivery means for such backwash fluid will operate on a time cycle so as to increase the efficiency of the filtering and the backwash action as a whole.

Details of the foregoing objects and of the invention, as well as other objects thereof, are set forth in the following specification and illustrated in the accompanying drawings comprising a part thereof.

In the drawings:

FIG. 1 is a plan view of an exemplary transverse section of a backwash sand filter system embodying the principles of the present invention.

FIG. 2 is a vertical sectional view of the portion of the system shown in FIG. 1 as seen on the line 2—2 of FIG. 1, primarily to illustrate certain details of the filter bed of the system and the direction of the flow of fluid therethrough while being filtered.

FIG. 3 is a vertical sectional view similar to FIG. 2, but taken on the line 3—3 of FIG. 1, and illustrating details of the backwashing mechanism of the system, parts of the mechanism being broken away and other parts being shown in section to illustrate to best advantage details of the apparatus.

FIG. 4 is a fragmentary vertical longitudinal section through part of the washfluid hood and illustrating details of the improved scarifying means illustrated in engagement with the upper surface of the sand filter bed, in exemplary manner.

FIG. 5 is a fragmentary vertical sectional view of the scarifying means otherwise shown in FIG. 4 and illustrating the mechanism by which it is supported, generally as seen on the line 5—5 of FIG. 4.

FIG. 6 is a vertical side elevation illustrating a fragmentary portion of one side of the tank for the influent fluid and filter mechanism, as seen on the line 6—6 of FIG. 3, for purposes of illustrating details of the improved slidable shoe mechanism for delivery of washfluid to the underside of the filter bed and illustrated on a larger scale than employed in FIG. 3.

FIG. 7 is a vertical sectional view through the structure shown in FIG. 6, as seen on the line 7—7 of FIG. 6.

FIG. 8 is a horizontal fragmentary sectional view of the slidable shoe structure and the means engaged thereby on the filter tank, as seen on the line 8—8 of FIG. 6.

FIG. 9 is a fragmentary vertical sectional view of a sand bed and fluid receiving channel therebelow to illustrate the compartments thereof.

Referring to FIGS. 1 through 3 particularly, a filter tank 10 is defined by opposite, parallel side walls 12 and 14 connected by a bottom 16, all of which preferably are formed, on the site, from cement. However, metal or other appropriate forms of tank may be used if desired. Disposed along opposite sides of the filter tank 10 are additional walls 18 and 20. It also will be understood that the tank has opposite end walls and, in its preferred construction, the tank 10 generally is rectangular in plan view in most installations.

Walls 12 and 18 cooperate to form therebetween an effluent channel 22, and walls 14 and 20 define therebetween an influent channel 24. Fluid to be filtered is directed into influent channel 24 and discharges therefrom, through a series of suitable inlet ports 26, which are formed in wall 14, into the filter tank 10.

The filter means employed in the system embodied in the present invention comprises a layer of suitable porous material consisting of blocks or plates 28 thereof which are supported within a common, substantially horizontal plane, by suitable channel-defining means 30, see FIGS. 1 and 9, illustrated by broken lines, which may be formed from any suitable means such as impervious vertical metal plates, in spaced relationship above the sloping surface 32, see FIG. 2, which extends between walls 12 and 14, and slopes gradually downward from wall 14 toward wall 12 as clearly shown in FIG. 2.

A layer of suitable filtering sand 34, of appropriate depth, composition and consistency, as dictated by conventional use in filters of the type described, is supported by the layer of porous material 28. Influent fluid, which enters the filter tank 10 through inlet ports 26, percolates through the bed of filter sand 34, also passing through the porous material 28 and drains or seeps into the fluid receiving means 36 which actually comprise passages defined by the parallel dividing means 30 and the length thereof being determined by walls 12 and 14 as clearly shown in FIG. 2. One end of each of said elongated fluid receiving means 36 is closed by wall 14, while the opposite end of each of said means communicates with a discharge port 38, a horizontal row of which are formed in the lower portion of wall 12 as clearly shown in FIGS. 1, 2 and 6.

For purposes of providing a relatively smooth exterior surface along the lower portion of wall 12 in the vicinity of the exit ends of discharge ports 38, an appropriate metal channel 40 may be employed, the flanges thereof being directed inwardly and embedded within the cement wall 12, for example. The web of said channel is provided with holes coaxial with and of the same size as the outer ends of the ports 38 which extend through wall 12. Further, the outer surface of the web of channel 40 is covered by an appropriate wear-resisting layer 42. Various kinds of hard, wear-resistant materials are suitable for use, certain of these being formed from appropriate resin impregnated bearing material. The same may be attached by any suitable means to the outer surface of the channel line 40 and is for purposes to be described.

Depending upon the amount of suspended or entrained matter within the influent liquid which enters the filter tank 10 through inlet ports 26, and particularly depending upon the coarseness and porosity of the sand which has been selected for the formation of the filter bed 34 in accordance with the type of fluid to be filtered by the apparatus, the filtering efficiency of the sand bed 34 gradually diminishes as extraneous, undesired impurities and silt suspended within the influent become accumulated upon the upper surface or within the pores of the upper portion of the sand bed 34. Such clogging of the sand bed will result in the influent fluid above the sand bed 34 gradually rising until a predetermined exemplary level 44 thereof, as shown in FIG. 2, is reached. In accordance with the desired operation of the filter system, and assuming that the illustrated exemplary level 44 is that which has been determined to be the maximum level before backwashing of the sand bed 34 is to occur, backwashing mechanism of the type illustrated in FIGS. 1 and 3 through 8 is placed in operation.

The backwashing mechanism contemplated for use by the present invention comprises a carriage 46 which extends transversely between the upper surfaces of the walls 12 and 14, said walls respectively supporting rails 48 which are engaged by supporting wheels or rollers 50. As best shown in FIGS. 1 and 3, one end of the carriage 46 extends at least partially over the effluent channel 22 and supports a motor 52 which drives a pump 54 which is supported at a suitable level to be disposed within the body of effluent fluid in channel 22, the exemplary level 56 of which is illustrated by a broken line in FIG. 3. Such effluent fluid is that which has percolated through the sand bed 34, the porous material 28 and into the fluid receiving means comprising channels 36, finally being discharged through ports 38 into effluent channel 22.

The pump 54 draws in effluent fluid from channel 22 and forces the same through a discharge conduit 58 which is supported by a vertical arm 60 which, at its upper end, is pivotally connected to carriage 46 by means of a pivot rod 62, best shown in FIG. 7. Through the means of a suitable compression spring 64 which extends between a bracket 66 on carriage 46 and the outer surface of the vertical arm 60 in spaced relationship below the pivot rod 62, the lower end of the arm 60 is urged toward the outer surface of wall 12.

For convenience, the arm 60 may comprise a channel, the flanges of which extend outwardly, away from wall 12. The lower portion of the web of channel 60 is interrupted to permit passage therethrough of a horizontal inlet conduit 68, as best shown in FIGS. 6 through 8, said conduit being connected by a flexible cylindrical conduit section 70, for which appropriate flexible hose material is suitable, to the lower end of discharge conduit 58, by appropriate clamp means 72. The discharge end of conduit 68 is connected to a longitudinally extending shoe 74 which is substantially elongated, as best seen in FIGS. 6 and 8, the inner surface thereof also being provided with an elongated recess 76 which, in its preferred arrangement, is appreciably longer than the diameter of the outer ends of each of the ports 38, as can be seen from FIG. 8. The shoe 74 is supported vertically by flexible means such as a few links of chain 78 which are connected at the upper ends thereof to brackets 80 fixed to arm 60, as best shown in FIGS. 6 and 7, whereby the shoe 74 is supported against any appreciable vertical movement downwardly by the above-described means which are longitudinally spaced with respect to shoe 74.

To assure the firm engagement of the inner surface of shoe 74 with the wear-resisting layer 42 on the outer surface of wall 12, it will be seen with reference to FIG. 8 that a plurality of compression springs 82 are supported between the shoe 74 and additional brackets 84 which also are carried by the lower portions of vertical arm 60, the same being connected to the flanges thereof as best shown in FIG. 8. The inner ends of said brackets also are arranged to be engaged by projections 86 on the outer surface of shoe 74 so as to insure longitudinal movement of the shoe 74 along the layer or surface 42 as the arm 60 is moved in opposite directions by carriage 46.

The shoe-supporting mechanism described immediately above comprises one of the important advantages of the present invention due to the fact that irregularities in the surface of layer 42 as well as shifting of the carriage into a slight angular relationship with the layer 42 and wear of the shoe 74 and layer 42 will not be linearly constant over periods of use of a filter system of this type. Heretofore, in regard to delivery means for backwashing or backflushing fluid, traveling shoes or distribution members were improperly supported by the supporting means therefor and, when such uneven or irregular surface areas or positioning developed along the inlet wall of the tank through which the washfluid was to be introduced to the undersurface of the filter bed, such mounting of the slidable shoe resulted in the inner surface thereof being spaced from said surface at different locations along its path of travel and to varying degrees, whereby a highly undesirable amount of leakage of washfluid occurred at various points of travel. Although the washfluid which leaked, as described, was immediately discharged back into the filtered effluent in channel 22, more power than necessary was required and, also, the amount of backwash effected was reduced, at times, to such an extent as to destroy the cleaning action of the sand bed and cause the filter to fail to perform properly.

Through the use of the flexible connection between shoe 74 and the lower end of supporting arm 60 to the means described hereinabove, and through the utilization of the compression springs 82 which are operable to constantly press the inner surface of shoe 74 against the wear-resisting layer 42, any irregularities or unevennesses which occur at any time in the outer surface of layer 42 will be compensated for through the faithful following of the inner surface of shoe 74 along the outer surface of layer 42, whether it has irregularities therein or not. Accordingly, maximum efficiency results from the pumping operations by which the washfluid is delivered through ports 38 to the undersurface of porous members 28 and upon passing therethrough the washfluid is discharged upwardly, as shown by the indicating arrows in FIG. 3, through the sand bed 34 in reverse direction to that traversed by the fluid while being filtered. Such washfluid, in passing through the sand bed and particularly near the surface thereof, carries with it entrained and entrapped solid, semi-solid and colloidal contaminants which have been removed from the influent fluid incident to the same being filtered by sand bed 34 prior to the backwash cycle.

In order that the dislodged contaminants will not be discharged from the upper portion of the filter bed 34 into the entire body of fluid in the filtering tank 10, the carriage 46 supports a washfluid hood 88, best shown in FIGS. 3 and 4, which resembles an inverted trough extending between the inner surfaces of walls 12 and 14 as clearly shown in FIG. 3, the ends of the hood being relatively close to the inner surfaces of said walls so as to effect maximum efficiency in the removal of the contaminated washfluid which has been forced upwardly through the sand bed 34 and has entrained therein all or substantially all of the accumulated contaminants removed from the filtered influents when passing downwardly through the filter bed 34.

Extending longitudinally within the hood 88 is an elongated suction tube 90 provided with a plurality of inlet ports 92 therein. Centrally of the suction tube 90 is the inlet head 94 of a pump 96 driven by a motor 98 carried by the carriage 46 and operable to pump the contaminated washfluid which has just flushed the contaminants from the upper portion of sand bed 34, through discharge pipe 100 which empties into an appropriate trough 102 or the like so as to carry the contaminated washfluid to suitable settling means or to a waste pool or the like.

For efficiency, the hood 88 is sufficiently wide in the direction of the path of movement of the carriage 46 to cover at least a little more than the width of each of the channels defined by the parallel means 30 illustrated in FIGS. 1 and 9. Accordingly, as the carriage 46 slowly moves along the tank 10 from one end to the other thereof, the flushing of each of the sections of the sand filter bed 34, between the channel-defining means 30, is accomplished through efficient flow of washfluid from the shoe 74, successively through the fluid-receiving means 36 and upwardly through the porous supporting means 28 and sand filter bed 34, for removal by suction through the function of the hood 88 and the suction means carried thereby, all of which are supported from the carriage 46 by appropriate struts 104 or the like. Such struts may be adjusted in vertical length to position the hood 88 a desired distance relative to sand bed 34.

In the operation of filter beds and systems of this type, it has been found that the upper surface of such filter beds not infrequently become compacted and somewhat encrusted, in addition to becoming permeated with contaminating material which has been removed by filtering from influent fluid which passes through the filter bed. To facilitate the backwashing and resulting flushing of such sand filter beds, and particularly the upper portions thereof, the present invention contemplates the use of scarifying or agitating means which preferably are carried by a transversely extending support such as a channel 106, best shown in FIGS. 4 and 5. The channel preferably extends substantially the full length of the hood 88 and is disposed therein below the suction tube 90 as can be seen from FIG. 4.

The scarifying means employed in accordance with the principles of the present invention comprises a series of similar U-shaped or loop scarifying members 108 having transversely spaced, substantially parallel eyelets in the upper ends thereof through which a supporting rod 110 extends. Adjacent opposite ends of the channel 106 as well as intermediately of the ends thereof, a plurality of depending brackets 112 are provided, said brackets having openings 114 therein which have an area greater than the cross-sectional area of the rod means 110 and, particularly, the openings 114 have a vertical dimension greater than the diameter of rod means 110.

In the specifically illustrated design, it will be seen that the openings 114 are triangular in shape, the rod means 110 normally resting by gravity in the lower corner of the openings 110. However, in the event the scarifying member 108 might engage an obstruction, particularly channel defining or partition means 30, within the upper portion of the filter bed 34 during the movement thereof along said upper surface, it is possible for the rod means 110 to move relative to the holes 114 in the supporting brackets 112 and thereby become disentangled from said obstruction, thereupon resuming the normal depending position thereof with respect to the rod means 110 being supported in the lower corner of the openings 114.

Especially from FIG. 4, it can also be appreciated that the relative closeness of the scarifying members 108 with respect to each other will result in a substantially even surface being formed upon the top of filter bed 34 after the scarifying means have moved thereover incident to the travel of the carriage 46 between opposite ends of the filter bed and the tank containing the same. Such agitation or scarifying of the upper portion of the sand bed also will occur substantially to an even depth.

As has been indicated above, the preferred method of operating the backwashing mechanism of the present invention involves the use of certain adjustable means by which movement of the carriage 46 is initiated together with the backwashing operation which principally is effected by the pumps 54 and 96. The carriage is motivated by any suitable drive means such as another motor-reducer unit 116 which is supported by carriage 46 and, through the means of a drive chain or belt 118, revolves an axle or shaft 120, shown in FIG. 3, which extends between a pair of the rollers 50 which are affixed to the outer ends of said axle so as to be driven thereby for movement of the carriage along the rails 48.

The carriage 46 remains immobilized adjacent one end or the other of the tank 10 until the porosity of the filter bed 34 is reduced by the accumulated contaminants on the upper surface thereof to such an extent that the body of influent fluid above the filter bed reaches a predetermined level at which a control sensing member 122 has been set as indicated in FIG. 3. The engagement of said member by the fluid level initiates the operation of suitable control mechanism such as switches, relays, and the like which are contained, for example, within control box 124, whereupon motor 116 commences slowly to drive the carriage 46 toward the opposite end of the tank 10, pump motor 52 actuates pump 54 to take in filtered effluent fluid and discharge the same through slidable shoe 74 successively into the fluid-receiving channels 36 beneath the porous supporting member 28 and upwardly through the sections of the filter bed 34. Washfluid removal motor 98 also is started so as to actuate suction pump 96 and effect removal of contaminated liquid or washfluid from immediately above that section of the sand filter bed which is being backwashed at any given time, such contaminated fluid being discharged into channel 102, for example, for removal to a settling basin or to waste discharge.

As the various sections of the filter bed 34 successively are backwashed, the thoroughness of such depends upon the speed of travel of the carriage 46, the capacity of pump 54, and discharge capacity of pump 96, all of which are regulated to effect maximum efficiency in the cleaning of the filter bed in accordance with the requirements placed upon the same by the degree of contamination of the influent from channel 24, the sections of the filter bed 34 being successively backwashed until the porosity of the filtering system is restored to the desired rate of filtering. This will result in the level of the influent fluid above the sand bed being lowered to the exemplary level 126 thereof shown in FIG. 3. This level will be controlled by a second control sensing member 128, the position of which is adjustable in accordance with requirements.

The carriage 46 continues to move from end to end of the tank 10, successively in reverse directions, until the sand bed has been cleaned of accumulated contaminating matter to a relatively high degree. Reversing of the movement of the carriage is effected by a reversing switch 130 carried, for example, by one end of the carriage, as shown in FIG. 6. The same has an operating lever which is engaged by actuating members 132 suitably fixed to one sidewall of tank 10 respectively adjacent opposite ends of the tank but spaced a sufficient distance from each end to permit the carriage to travel substantially to the ends of the tank before movement thereof is reversed. Only one member 132 is shown in FIG. 6 but it will be understood a similar one is positioned near the opposite end of the tank, such opposite end being omitted from FIG. 6 to minimize the illustration.

The reversing switch 130 is connected in the circuit of the entire mechanism and especially that of the various controls in control box 124. The circuit arrangement is relatively simple and no diagram is believed necessary. The sensing members 122 and 128 also are in the circuit and, upon the fluid level in tank 10 being lowered to a predetermined amount at the completion of a backwashing operation the sensing member thus effected will trigger the circuit and upon the carriage reaching the end of the tank toward which it then is traveling, the reversing switch 130 is tripped to reverse movement of the carriage but the circuit to the various motors will then be opened by controls in box 124, whereby the carriage stops at that end of the tank. Thus, the carriage and its control circuit will be conditioned to start operation back toward the opposite end when the upper limit sensing member is activated due to the rising of the fluid in tank 10 to another predetermined level as a result of the sand bed being clogged a predetermined amount by accumulated contaminants filtered from the influent fluid. When this occurs, the entire mechanism is placed in operation for another cycle. By such operation, no wasteful, immediate re-washing of one or the other ends of the sand bed will occur.

While the invention has been described and illustrated in its several preferred embodiments, it should be understood that the invention is not to be limited to the precise details herein illustrated and described since the same may be carried out in other ways falling within the scope of the invention as claimed.

We claim:

1. An automatic backwash sand filter comprising a tank, substantially horizontal porous means to support a sand bed in the lower portion of said tank, means to deliver influent fluid to be filtered to the upper portion of said tank above a sand bed when formed in said tank, and fluid-receiving means beneath said porous support means for the reception of filtered fluid therefrom, said fluid-receiving means having an elongated surface along the lower portion of one side of said tank provided with a row of ports through which fluid exists from said fluid-receiving means, in combination with backwashing means movable along a path between opposite ends of said tank and including a carriage movable along the upper portion of the tank, an arm depending from said carriage adjacent the exterior of said one side of said tank having said elongated surface along the lower portion thereof, pivot means connecting the upper end of said arm to said carriage for limited lateral movement of the lower end of said arm toward and from said elongated surface along the lower portion of one side of said tank, compressible means supported by said carriage and engaging said arm below said pivot means and operable to yieldably urge said lower end of said arm toward said elongated surface as aforesaid, pump means carried by said carriage, flexible fluid conduit means having an inlet end connected to said pump means, a shoe, means connecting said shoe flexibly to the lower end of said arm for support thereby and means connecting said shoe to the discharge end of said conduit means, said shoe having a surface slidably engaging said elongated surface of said fluid-receiving means in line with said row of ports therein and communicating selectively with said ports, thereby to permit the flow of washfluid through said ports into said fluid-receiving means and upward through said porous support for a sand bed to effect flushing of accumulated impurities from a sand bed when formed upon said porous support, and compressible yieldable pressure means carried by the lower end of said arm and interposed between said shoe and means fixed to the lower end of said arm and in conjunction with the force of said compressible means engaging said arm comprising the only means operable to urge said slidable surface thereof firmly and yieldably into close sliding and sealing conformity against said elongated ported surface along said one side of said fluid-receiving means to insure substantially no leakage between said slidably engaged surfaces during travel of said shoe relative to said elongated surface as said carriage moves along said tank.

2. The sand filter set forth in claim 1 further characterized by said shoe being elongated longitudinally in the direction of movement thereof along said ported side surface of said tank, and said supporting means therefor being connected to the lower end portion of said arm and also connected to said shoe at longitudinally spaced locations to support said shoe movable relative to said arm with its longitudinal axis maintained substantially horizontal and thereby permit limited movement of said shoe relative to said arm in a plurality of directions.

3. The sand filter set forth in claim 1 further characterized by said yieldable pressure means comprising resilient compression members extending between the lower end portion of said arm and longitudinally spaced portions on the outer surface of said shoe and operable to maintain said shoe in close sliding contact with said ported elongated side surface of said tank, and said supporting means for said shoe also including means on said shoe and the lower end portion of said arm which abut and are operable to engage each other during movement of said carriage along said tank in either longitudinal direction to insure positive movement of said shoe by said arm along said ported surface.

4. The sand filter set forth in claim 1 further characterized by said ports being of substantially uniform diameter and evenly spaced along said side of said tank, and said shoe having a discharge cavity on the slidable surface thereof communicating with said flexible conduit and entirely within the boundary of said shoe, said cavity having a longitudinal dimension substantially greater than the diameter of said ports, thereby insuring ample discharge capacity and overlapping of said cavity with each port as it is delivering flushing fluid from said shoe successively to said ports and fluid-receiving means while said shoe is moving longitudinally along said ported side of said tank.

5. An automatic backwash sand filter comprising a tank, substantially horizontal porous means arranged to receive and support a sand bed in the lower portion of said tank, means to deliver influent fluid to be filtered to the upper portion of said tank above a sand bed when therein, and fluid-receiving means beneath said porous support means for the reception of filtered fluid therefrom, said fluid-receiving means having an elongated surface along the lower portion of one side of said tank provided with ports through which fluid exits from said fluid-receiving means, in combination with a carriage extending between the opposite sides of said tank and movable along the upper portion of said tank between the opposite ends thereof, backwashing means carried by said carriage for discharge of washfluid through said ports and into said fluid-receiving means for flushing action upwardly through said porous means and a sand bed when supported thereon to clean said bed of material filtered from fluid while passing downwardly through said sand bed and accumulated upon the upper portion thereof, and scarifying means supported by said carriage and comprising horizontal rod means extending transversely between opposite sides of said tank, said rod means supporting a series of similar individual agitating elements in dragging relationship to the upper surface of said bed and supported upon said rod means for free independent pivotal movement in close relationship to each other and having relatively closely arranged scarifying portions thereon operable to penetrate and agitate the upper surface of said filter bed for a substantially uniform depth evenly across the full width thereof as said carriage moves longitudinally relative to said bed to facilitate cleansing of said bed by backwashing.

6. The sand filter set forth in claim 5 further including brackets supporting said rod means at longitudinally spaced positions therealong, said brackets having openings therein of greater area than the cross-sectional area of said rod means and having a greater vertical dimension than the diameter of said rod means, said rod means normally being positioned in the lowermost portion of said openings and movable upwardly therein upon said scarifying elements encountering any obstruction in said filter bed, thereby minimizing the possibility of injury to said filter mechanism and scarifying means.

7. An automatic backwash sand filter comprising an elongated tank of substantially uniform depth extending substantially horizontally, substantially horizontal porous means in the lower portion of said tank arranged to support a sand filter bed thereon, means to deliver influent fluid to the upper portion of said tank for filtering through such sand bed when arranged in said tank, a carriage extending across said tank between the sides thereof and movable along the upper portion of said tank from end to end thereof, backwashing means carried by said carriage and having delivery means for backwashing fluid movable along the lower portion of one side of said tank and arranged to communicate through said porous means with the interior of said tank beneath the level of a sand filter bed when in said tank to backwash the same upwardly and free the upper surface portion of such bed from accumulated solid and colloidal material removed from said influent fluid, means dividing said filter bed into sections extending transversely thereof, hood means carried by said carriage and extending transversely across said tank between the side walls thereof and adjacent the upper surface of such sand bed, suction pump means operable to pump flushed washfluid from the interior of said hood means as the sections of the bed are traversed successively thereby while being backwashed, power means carried by said carriage operable to move said carriage along said tank and simultaneously operate said backwashing means and suction pump for said hood means, first control means responsive to the decrease in filtering rate of said sand bed operable to energize said power means to perform said aforementioned functions, and additional control means for said power means responsive to the cleansing of said sand bed of accumulated material to a desired degree and operable to de-energize said power means, said additional control means comprising two actuating members fixed relative to said tank respectively adjacent the opposite ends thereof to effect such de-energizing of said power means only when said carriage has reached one of the ends of said tank, whereby upon said power means being energized the backwashing of the sand bed is accomplished with maximum efficiency for the full length thereof.

8. A method of operating an automatic backwash filter system comprising means to support a sand bed within an elongated tank upon porous means through which filtered fluid drains, backwash means mounted on a movable carriage movable along said bed and operable to force filtered fluid upwardly through successive sections of said porous means to flush accumulated material from the upper portion of said sand bed for removal therefrom to clean said bed, and control means for said backwash means responsive to a predetermined condition of said filter system to start and stop the operation of said backwash means, said method comprising the steps of delivering fluid to be filtered to the upper portion of said tank, filtering said fluid by gravity through said sand bed until material accumulated on the upper portion of said bed has reduced the filtering rate thereof to a predetermined amount, commencing operation of said backwash means at one end of said tank when said reduced amount of filtering rate has been reached and continuing said backwashing through successive complete passes of said backwash means between ends of said tank until the filtering rate of said bed has been restored to a predetermined rate, and discontinuing said backwashing operation when said carriage has reached one end of said tank, said carriage remaining at said one end of said tank until said backwash control means in response to a predetermined condition of said filter system, actuates the carriage and backwashing means, thereby repeating the cycle.

References Cited by the Examiner

UNITED STATES PATENTS

| Number | Date | Name | Class |
|---|---|---|---|
| 397,170 | 2/1889 | Cleaver | 251—176 |
| 649,409 | 5/1900 | Jewell | 210—274 X |
| 662,287 | 11/1900 | McDonald | 251—176 |
| 729,718 | 6/1903 | Blaisdell | 210—271 |
| 1,767,729 | 6/1930 | Bayard et al. | 210—276 X |
| 2,074,965 | 3/1937 | Laughlin et al. | 210—276 X |
| 2,236,128 | 3/1941 | Poole | 210—513 X |
| 2,302,449 | 11/1942 | Laughlin | 210—273 |
| 2,302,450 | 11/1942 | Laughlin | 210—290 X |
| 2,311,594 | 2/1943 | Lose | 210—271 X |
| 2,335,749 | 11/1943 | Fraser | 210—80 |
| 2,350,160 | 5/1944 | Fraser | 210—80 |
| 2,442,594 | 6/1948 | Fraser | 210—276 X |
| 2,583,039 | 1/1952 | Boesger | 137—627 X |
| 2,867,289 | 1/1959 | Sare | 137—627 X |

REUBEN FRIEDMAN, *Primary Examiner.*

ROBERT F. BURNETT, *Examiner.*

D. M. RIESS, D. TALBERT, *Assistant Examiners.*

Disclaimer 3,239,061.—*Clark Sheldon Horning*, Dover, and *Henry William Jacobs*, York, Pa. AUTOMATIC BACKWASH SAND FILTER AND PROCESS OF CLEANING SAME. Patent dated Mar. 8, 1966. Disclaimer filed Feb. 7, 1977, by the assignee, *Environmental Elements Corporation*.

Hereby enters this disclaimer to claims 5 and 6 of said patent.

[*Official Gazette May 3, 1977.*]